REISSUED

Patented Apr. 10, 1934

SEP 30 1941

1,954,778

UNITED STATES PATENT OFFICE 1,954,778

ROOFING GRANULES AND METHOD OF PRODUCING SAME

Ernest H. Nichols, Hagerstown, Md.

No Drawing. Application November 1, 1932,
Serial No. 640,733

10 Claims. (Cl. 91—70)

This invention relates to new and useful improvements in granular material, such as is principally used as a surfacing for asphalt shingles and other forms of asphalt roofing, known as "roofing granules", and more particularly to roofing granules having a glassy or vitrified surface.

It has been found that, while glazed granules present an attractive appearance and posses other favorable characteristics, they do not properly adhere to the asphalt base of which the roofing is composed, but become detached therefrom in large quantities, and fall to the ground, causing the roof to present an unsightly appearance. Again, in the manufacture of roofing granules of the type to which this invention relates, it has been customary to make the granule stock of one material, by grinding and screening the same and by then applying a glazed surface of another material, acquired for the purpose at an additional expense. During the grinding process, a large amount of material has been produced which has been too small for use as granule stock and which has, on that account, been discarded as refuse, resulting in considerable waste.

It is, therefore, an object of the invention to produce roofing granules of the glazed surface type, which will properly adhere to the surface of the roofing in connection with which they are used, and a further object to produce a method of manufacturing the same to eliminate the waste resulting from the grinding process, as far as possible.

In the manufacture of granules of the type to which this invention relates, the granule base or stock is formed of silica quartz, such as is found in the vicinity of Akron and Youngstown, Ohio, as this material possesses a proper degree of hardness, is not sufficiently brittle to interfere with its being satisfactorily comminuted, and because of its high silica content, it will fuse readily.

The quartz is first ground in a suitable crusher to reduce it to comparatively fine particles. It is then subjected to a screening operation to obtain those particles that will pass a No. 8 screen but are retained on a No. 35, and these particles are then set aside for use as the granule stock.

During the grinding process, to which it is customary to subject the material of which roofing granules are made, in order to produce the granule stock, it is impossible to prevent the production of considerable waste material, ranging from exceedingly fine powder to that which just succeeded in passing the retaining screen. In the present process, there is no such waste, as this material is utilized in the manufacture of the finished product.

The otherwise waste material, to which reference has just been made, is used in the making up of a surfacing mixture for coloring the granules and to provide a glazed, irregular surface thereon, in a manner now to be described. A suitable amount of this heretofore waste is placed in a pebble mill, together with proper portions of boric oxide and color oxide, according to the color desired, also a sufficient amount of water to dissolve boric oxide and insure proper grinding. Obviously boric oxide, which is known to have a solubility in water of between 1.1 and 16.4 grams in 100 cc. of water dependent on the temperature, is a water soluble chemical and it is further known that boric oxide is an excellent flux for silica or quartz. The mill is then operated to dissolve the boric oxide and to crush the coarser particles of the quartz to such a degree that it will all pass a No. 60 screen. This quartz will then include sizes ranging from the finest powder to those that just succeeded in passing the screen. To the result is then added a sufficient amount of water to impart a proper consistency, thus completing the surfacing mixture. It has been found that a suitable surfacing mixture may be produced by using the following proportions: 45 pounds of the silica quartz; 6 pounds of boric oxide; 50 pounds of color oxide; and an amount of water as explained. It may develop, however, that, under certain conditions, better results may be obtained by varying these proportions somewhat.

Having now produced the granule stock and the surfacing mixture, the next step in the process of manufacture is the coating of the stock with the mixture preparatory to firing, and this is accomplished by thoroughly mixing the stock in a suitable mixing machine in the proportions of one ton of stock to five gallons of mixture. Particular attention is here called to a most important feature of the present invention, namely, the fact that the coating with which each particle of the granule stock is now thoroughly covered, includes particles of the silica quartz ranging in size from exceedingly fine powder up to the sixty mesh size.

After the excess surfacing mixture has been drawn from the mixer, the stock is permitted to pass from the latter, through a suitable chute into the higher end of an inclined rotary kiln, the heating element of which, preferably an oil burner, is so controlled as to produce within the kiln an atmosphere which is divided into approximately three zones of temperature, each extending practically one-third of the kiln length. The first zone of temperature, which is that into which the granule stock first passes on entering the kiln is maintained at approximately 1100° F., the second, or central zone, being maintained at approximately 1500° F., and the third, at the exit end, being maintained at approximately 1200° F. Owing to the rotation of the kiln, the stock, during its passage therethrough, which passage is brought about by the inclination thereof, is constantly agitated, so that its particles are evenly subjected to the temperature within the various zones, on all sides, and will not fuse together. Upon passing through the first zone, the stock becomes thoroughly dry. It next passes through the second or vitrifying zone. Here the finer particles of the silica quartz contained within the surface coating become completely melted and form a fluid which mixes with the boric oxide and color oxide. The larger particles of the silica quartz, owing to their greater size, do not completely melt down, however, before passing from this vitrifying zone, but fuse on their surfaces only. As a result, they do not so mix with the melted finer particles as to completely lose their identity, but remain suspended therein. This surface fusing of the larger particles will, however, be sufficient to take up a proper amount of the color oxide and boric oxide, so that the entire surface of the completed granules will possess an even color and the characteristics resulting from the use of the boric oxide. As the surface of each particle of the granule stock will also have become fused to a degree, the now fused surfacing mixture will firmly adhere thereto.

Having been thus coated, the stock, before emerging from the kiln, now passes through the third zone which, being of a somewhat lower temperature than the vitrifying zone, prevents too sudden cooling of the stock. Having traversed this zone, the stock passes from the lower end of the kiln into and through a suitable rotary cooler where its temperature is reduced to the proper degree and from this cooler the now completed roofing granules pass to storage.

It will be understood that the degree of inclination of the kiln must be such as to cause the stock to consume such a length of time, in passing through the various heat zones, as will produce the results herein outlined. This is particularly true with respect to the central or vitrifying zone, as the stock must pass therefrom before the larger particles of quartz in the surfacing mixture have become completely melted. Because of the failure of these larger particles to completely melt down into and mix with the melted finer particles, they protrude beyond the surrounding surface of the granule, thus producing the uneven surface condition which is necessary in order to insure proper adherence to the asphalt surface in connection with which the granules are intended for use. The fused surfaces of these larger particles, having taken up a proper amount of the color oxide and the boric oxide, as has also the surrounding surface, the entire surface of each finished granule is not only evenly glazed but also evenly colored and possesses a proper degree of "toughness", the latter characteristic being due to the use of the boric oxide.

It will be understood that the portion of the so-called waste material which remains on the No. 60 mesh screen will be returned to the pebble mill when making up a subsequent batch of surfacing mixture. Due to this fact and also due to the fact that the excess surfacing mixture drawn from the mixer will be used as a part of a subsequent batch of that mixture, when coating the stock, there will be practically no waste whatever in the manufacture of roofing granules under this method. Due to the elimination of this waste, and the saving resulting from the use of otherwise waste material for surface glazing, so that it is not necessary to purchase special material for that purpose, as is customary under other methods, it will be seen that the cost of manufacture has been reduced materially and that, at the same time, a process has been developed for producing roofing granules that possess great durability, that are evenly and brilliantly colored and, while being highly glazed, are so formed as to insure their proper adherence to an asphalt surface.

What is claimed is:

1. Roofing granules, each granule of which has a surface coating composed of partly fused granule particles and completely fused granule particles.

2. Granular material, each particle of which is provided with a coating including relatively much smaller particles of the same material, a portion of said smaller particles being completely fused and a portion of said smaller particles being partly fused.

3. Granular material, each particle of which consists of a central unitary and homogenous nucleus of quartzitic material and a coating of particles of fusible material of relatively small size fused together and to the surface of the nucleus, the nucleus and coating particles being of the same material.

4. A roofing material comprising a base the surface of which is mineralized with glazed granules as set forth in claim 3.

5. A roofing material comprising a base the surface of which is mineralized with glazed granules as set forth in claim 1.

6. A roofing material comprising a base the surface of which is mineralized with glazed granules as set forth in claim 2.

7. A method of making granular material which consists of producing granules from vitreous material, applying thereto a coating including a flux and relatively much smaller particles of the same material in differing sizes, and then firing the coated granules at such a temperature and for such a time as to fuse the surfaces only of the granules, as to completely fuse the smaller of the coating particles, and as to partly fuse the larger of the coating particles.

8. A method of making granular material which consists of producing granules from vitreous material, applying thereto a liquid coating including a flux and relatively much smaller particles of the same vitreous material in differing sizes, drying the coating, and then firing the coated granules at such a temperature and for such a time as to fuse the surfaces only of the granules, as to completely fuse the smaller particles of the coating, and as to partly fuse the larger particles of the coating.

9. A method of making roofing granules which consists of first producing granule nuclei by crushing vitreous material and separating certain large sizes thereof from the smaller sizes, crushing the smaller sizes to produce differing sizes relatively much smaller than the granule nuclei, applying to each particle of the granule nuclei a coating including a flux and said differing sizes, then firing the coated nuclei at such a temperature and for such a time as to fuse the surfaces only of the nuclei particles, as to completely fuse the smaller particles of the coating, and as to partly fuse the larger sizes of the coating.

10. A method of making roofing granules of quartzitic material which consists of crushing the material, separating from the larger particles of the crushed material certain particles of a predetermined size for use as granule nuclei and the smaller particles, regrinding the smaller particles to produce particles of much smaller size than the nuclei particles and of differing sizes, mixing with the reground particles a flux, a color oxide, and water to form a coating composition, coating the nuclei particles with said composition, subjecting the coated particles to a drying process, and heating the coating and dried particles to a temperature and for a time sufficient to fuse the surfaces only of the nuclei particles and to fuse the coating particles to each other and to the nuclei particles.

ERNEST H. NICHOLS.